March 27, 1951  A. F. LABROZZI ET AL  2,546,455

CUTTING TOOL

Filed Oct. 6, 1947

Inventors:
Anthony F. Labrozzi
Elmer M. Twelves
by their Attorneys
Howson & Howson Patented Mar. 27, 1951

2,546,455

UNITED STATES PATENT OFFICE 2,546,455

CUTTING TOOL

Anthony F. Labrozzi and Elmer M. Twelves, Philadelphia, Pa., assignors to Carey-McFall Co., Philadelphia, Pa., a corporation of Pennsylvania Application October 6, 1947, Serial No. 778,258

4 Claims. (Cl. 29—97)

This invention relates to new and useful improvements in cutting tools, and especially to cutting tools employing carbide and other super-hard cutting elements.

In machining certain metals by the use of carbide and other super-hard cutting tools, a glaze finish very often is produced on the surface of the machined metal. This glaze finish or surface usually is so smooth and slippery that the tolerances and specifications for the job can no longer be met. Thus, in the case of railroad car wheels and axles, the specifications generally require that the wheel bore to receive the axle shall be, for example, 0.001 inch less in diameter for each 1.0 inch diameter of the axle on which the wheel is to be pressed and that the pressure required to press the wheel on the axle shall be within a specified range of tonnages for a given axle diameter. However, when machining the axle bore of the car wheel with super-hard cutting tools, it has been found that the glaze finish or surface produced on the wall of the bore is so smooth and slippery that it reduces the resistance of a wheel being pressed on its axle to an extent that the required press tonnages cannot be attained at the tolerances specified for the wheel bore diameter. This condition also exists in other instances than car wheel and axle work which is referred to for purposes of illustration only.

With the foregoing in mind, the principal object of the present invention is to provide a cutting tool for carbide and other super-hard cutting tips which is provided with novel means for roughing-up the smooth glaze finish or surface produced by such super-hard cutting elements.

Another object of the invention is to provide a cutting tool having surface-roughing means as set forth which is in the form of a burr adapted to engage the glazed surface produced by super-hard cutting elements.

Another object of the invention is to provide a cutting tool as set forth wherein the roughing burr is resiliently seated and means are provided for adjusting the force of the resilient seat against the burr.

A further object of the invention is to provide a novel cutting tool having the features and advantages described which is of relatively simplified construction, inexpensive to manufacture, and highly efficient and foolproof in operation and use.

These and other objects of the invention and the various features and details of the construction and operation thereof, are hereinafter fully set forth and described with reference to the accompanying drawing; in which.

Figure 1:
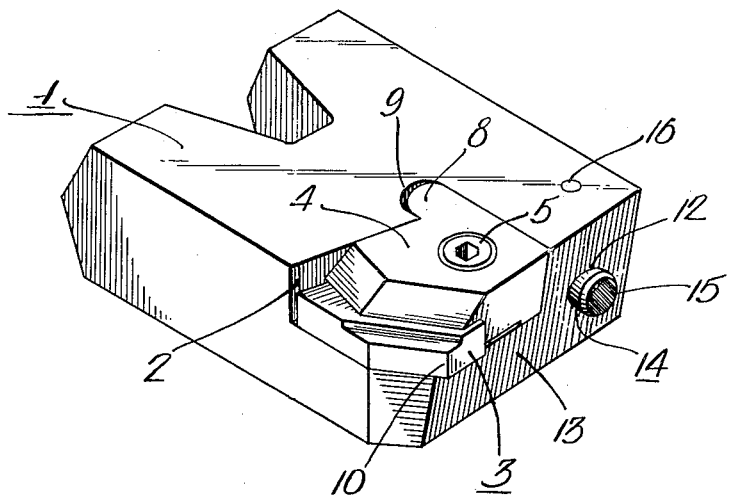
Fig. 1 is a view in perspective of a cutting tool made according to the present invention.

Referring now to the drawing, a cutting tool made according to the present invention comprises a shank or body 1 which preferably is composed of a tough grade of steel. The shank or body 1 is of generally rectangular form having parallel plane faces in one of which there is provided a recess 2 of predetermined configuration arranged to receive therein a tungsten carbide or other super-hard cutting tip or element 3, and a clamp block 4 for securing the tip or element 3 in said recess 2.

The clamp block 4 is secured in clamping engagement upon the cutting tip or element 3 by means of a clamp bolt 5 which is threaded into the shank or body 1 of the tool and has its enlarged head portion disposed within a recess or counterbore provided in the clamp 4 whereby the plane surface or face of the tool is preserved. In addition, and in order to preclude any pivotal movement of the clamp block 4 about the bolt 5 relative to the shank or body 1, the said clamp block 4 is provided with a projecting arm portion 8 that is received snugly within a correspondingly shaped extension 9 of the recess provided in the said shank or body 1.

In the illustrated embodiment of the invention, the cutting tip or tool 3 is of predetermined shape or configuration having angularly related surface portions that cooperate to provide a cutting edge 10 on the tip which projects furthermost therefrom in position for engagement with the article or surface to be machined thereby. Minor adjustments of the cutting tip 3 and its edge 10 relative to the tool body 1 may be effected by means of an adjusting screw 11 which is threaded internally of the body and disposed in backing engagement with the said tip 3. A lock screw 11a may be provided for the adjusting screw 11 as shown.

Figure 2:
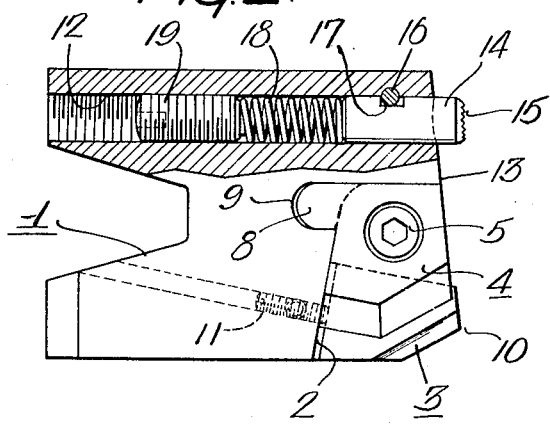
Fig. 2 is a plan view, partially in section, of the tool shown in Fig. 1.
Figure 3:
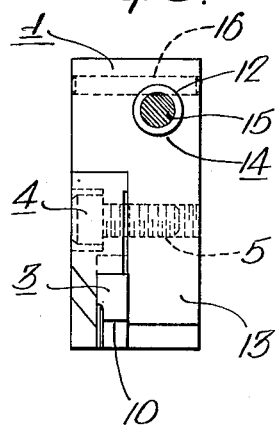
Fig. 3 is an end elevational view of the tool.
Figure 4:
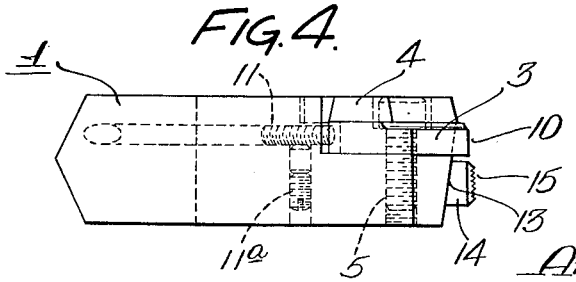
Fig. 4 is a side elevational view thereof.

With reference to Fig. 2 of the drawing, there is provided longitudinally through the shank or body 1 a bore or passage 12 which is located laterally adjacent the cutting tip 3 and opens outwardly through the end face 13 of the body from which the cutting edge 10 of the tip 3 is projected. Mounted within the bore or passage 12 is a burr or roughing element 14 which has its outer end face provided with a series of closely spaced parallel sawtooth-like cutting edges 15. The burr 14 is positioned longitudinally with respect to the bore 12 so that the cutting edges 15 thereon project a small distance beyond the tip cutting edge 10, for example, as best shown in Fig. 4 of the drawing, and the burr 14 preferably is anchored against rotation within the bore or passage 12, in a position rotationally with respect thereto, so that the said sawtooth cutting edges 15 are disposed at an acute angle of, for example, about 45° to the side faces of the tool shank or body 1 and to the tip cutting edge 10 as shown.

The burr 14 may be secured rotationally within the bore or passage 12 by means of a pin or the like 16 which extends through the body 1 and engages a recessed flat 17 provided in the said burr element 14. This flat 17 preferably has a width greater than the diameter of the pin 16 in order to permit of relatively limited axial movement of the burr 14 longitudinally within the bore 12 against the force of a coil spring or like resilient member 18 which operates normally to urge the burr to its outermost projected position. The spring or like member 18 permits the burr 14 to be displaced or actuated a short distance inwardly of the body 1 against the force of the said spring to the extent permitted by the width of the flat so that some give or yield to the burr is afforded as a safety measure. The force of the spring 18 opposing inward displacement of the burr 14 may be varied and regulated as desired by adjustment of a plug or the like 19 which is threaded into the bore or passage 12 in the relation shown in Fig. 2 of the drawing.

In operation, the cutting tool and work to be machined are moved relative to one another in a predetermined direction of travel such that the cutting tip 3 precedes or leads the burr 14 which trails the cutting tip 3 and subsequently engages the smooth glazed machined surface produced by the super-hard cutting tip 3 and effectively roughens and destroys the glaze surface to an extent that the tolerances and specifications for a given job can be met, it being noted that during such relative movement the parallel sawtooth cutting edges 15 of burr 14 are disposed at angles of about 45° to the direction of relative travel between the cutting tool and work. In other words, and considering again the example of the car wheel and axle previously described, the glazed surface produced in machining a wheel bore to the specified dimensions is so effectively roughened by the burr 14 that the wheel can be pressed upon its axle only by the application of pressure well within the range of tonnages specified for that diameter of axle.

From the foregoing description, it will be observed that the present invention provides a cutting tool for carbide and other super-hard cutting tips which is provided with novel means for roughing-up the smooth glazed surface produced upon metal machined thereby. The invention also provides a cutting tool as set forth having a surface-roughing means in the form of a burr adapted to engage the glaze surface produced by super-hard cutting elements. Furthermore, the invention provides a novel cutting tool as set forth wherein the roughing burr is resiliently seated and means are provided for adjusting the force of the resilient seat against the burr. In addition, the invention provides a novel cutting tool having the features and characteristics described which is of relatively simplified construction, inexpensive to manufacture and highly foolproof and efficient in operation and use.

While a particular embodiment of the present invention has been illustrated and described herein, it is not intended to limit the invention to such disclosure and changes and modifications may be made therein and thereto within the scope of the following claims.

We claim:

1. A cutting tool comprising a body member, a burr element mounted in the body member with its outer end projecting slightly beyond a face of the body member, a spring providing a yieldable seat for the burr element, and a member adjustable at will to vary the force exerted by the spring upon the burr element.

2. A cutting tool comprising a body member, a burr element mounted in the body member with its outer end projecting slightly beyond a face of the body member, means predeterminedly positioning said burr element relative to the body member, a spring providing a yieldable seat for the burr element, and a member adjustable at will to vary the force exerted by the spring upon the burr element.

3. A cutting tool for use in operations wherein the tool and work to be machined are moved relatively to one another in a predetermined direction of travel, said tool comprising a body member, a burr element mounted in the body member with its outer end projecting slightly beyond a face of the body member and provided on its projecting end face with a series of closely spaced parallel cutting edges, and means positively positioning the burr element within the body member so that the parallel cutting edges thereof are disposed at angles of about 45° to the direction of relative travel between the cutting tools and work.

4. A cutting tool for use in operations wherein the tool and work to be machined are moved relatively to one another in a predetermined direction of travel, said tool comprising a body member, a burr element mounted in the body member with its outer end projecting slightly beyond a face of the body member and provided on its projecting end face with a series of closely spaced parallel cutting edges, and means comprising a pin in said body member engaging a flat on said burr element for positively positioning the burr element within the body member so that the parallel cutting edges thereof are disposed at angles of about 45° to the direction of relative travel between the cutting tool and work.

ANTHONY F. LABROZZI.
ELMER M. TWELVES.

REFERENCES CITED

The following references are of record in the file of this patent:

UNITED STATES PATENTS

| Number | Name | Date |
|---|---|---|
| 2,392,285 | Gauthier | Jan. 1, 1946 |

FOREIGN PATENTS

| Number | Country | Date |
|---|---|---|
| 464,137 | Great Britain | Apr. 13, 1937 |
| 639,824 | France | Mar. 17, 1928 |